N. E. ALLEN.
Horse Hay Rake.
No. 19,975.
Patented April 20, 1858.
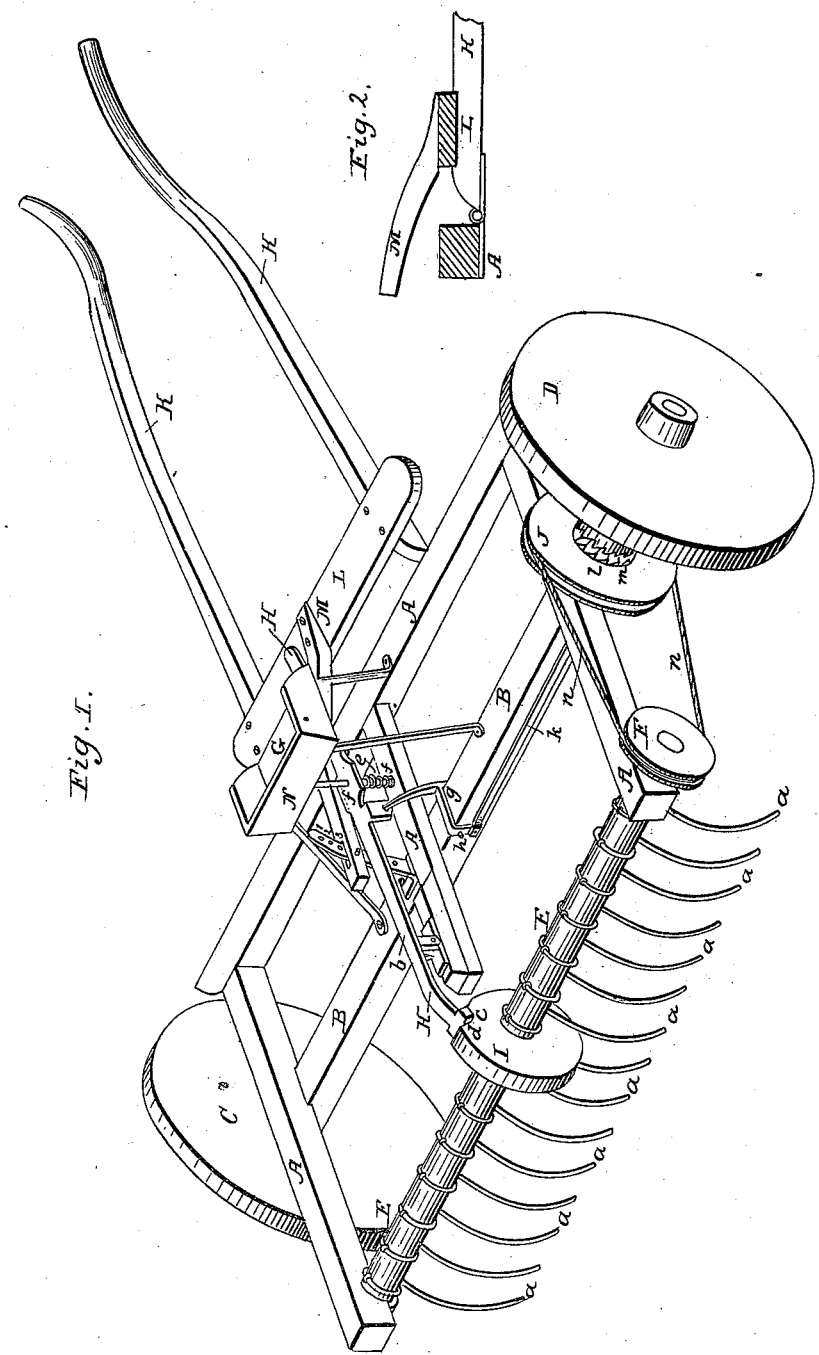

UNITED STATES PATENT OFFICE.

N. E. ALLEN, OF TRENTON, WISCONSIN.

IMPROVEMENT IN HORSE HAY-RAKES.

Specification forming part of Letters Patent No. 19,975, dated April 20, 1858.

*To all whom it may concern:*

Be it known that I, NELSON E. ALLEN, of Trenton, in the county of Dodge and State of Wisconsin, have invented certain new and useful Improvements in Hay-Rakes; and I do hereby declare that the following is a full, clear, and exact description of the construction and operation of the same, reference being had to the accompanying drawings, making a part of this specification, in which—

Figure 1 represents a perspective view of the rake complete and ready for use; and Fig. 2 represents a view of the hinged shaft, axle, and lever extending from the shafts to the frame of the machine, and which will be more especially referred to in the subjoined description.

My invention relates more especially to the mechanical connections between the rake and the driving-wheel, so that the operator, from his seat, can release the rake, and at the same movement throw it into gear with the driving-wheel, and thus give it (the rake) a compulsory revolution on its journals or shaft, and, by reversing said movement, lock the rake and throw it out of gear, so that it may stand in proper position for raking up the hay into the windrow until again released, as will be explained.

To enable those skilled in the art to make and use my invention, I will proceed to describe the same with reference to the drawings.

A represents a frame supported on an axle, B, said axle in turn being supported in wheels C D, of which the latter, D, is both a supporting and driving wheel.

E is a rake-shaft, which can rotate in suitable bearings on the frame A, and is furnished with any proper number of wire teeth a a a, &c. One of the journals of said rake-shaft E has upon it a pulley, F, by which it is rotated, as will be hereinafter explained.

G is the driver's seat, who is also the conductor of the machine. A lever, H, which has its fulcra at b, projects forward underneath the seat G or in close proximity thereto, so that the driver may from his seat operate said lever by his foot or hand. The rear end of the lever H is formed into a dog or pawl, c, which takes against the shoulder d in the cam-wheel I, that is connected to the rake-shaft E, and is held thereto by a spiral or other spring, e, until otherwise released. f is a guide-rod for steadying the spring e and for holding the lever H in proper position as it is operated. A double or single bell-crank lever, g, is pivoted to the axle B at h, and the arm i of this bell-crank is connected to the lever H, so that the pressing down or releasing of said lever will rock the bell-crank on its pivots or journals. To this bell-crank, on one or both sides of the axle B, may be pivoted a rod, k, that extends to and is connected with a semi-clutch, l, that can freely move on the axle B until forced by said bell-crank g and rod k into gear with another semi-clutch, m, formed on the hub of the driving-wheel D, and then the two parts, forming a regular clutch, they must rotate together until again released. On the semi-clutch l there is a pulley, J, around which and around the pulley F on the rake-shaft E passes an endless belt, n, for revolving the rake. This belt n may be a linked or punched belt, and pass over studs, pins, or teeth in the respective pulleys J F; or light cogged gearing may be used in place of the belt, the object being to have at the proper time a positive and certain rotation or semi-rotation of the rake, as may be desired, for double sets of rake-teeth may be used instead of single ones, as shown.

The arm i may be in the center instead of to one side of the bell-crank g, and its connection with the lever H may be varied to suit the circumstances of the case so long as the motion of the lever works said crank and causes it to effect the throwing in and out of action the parts which form the clutch.

The shafts K are hinged to the frame, as shown in Fig. 2, and to the cross-bar L of said shafts is connected a lever, M, which extends backward to a convenient position in regard to the driver's seat, so that the driver may at any time raise or lower or adjust the rake, the horse's back, when hitched to the machine, being, as it were, the fulcrum by which the frame is raised or lowered on the shafts, the shafts in turn being supported by the horse.

The rear end of this lever M may have a mortise in it, through which the curved arm or support N, which is affixed to the axle B or frame, may pass, and by means of a pin passing through one of the series of holes 1 2 3, &c., in said curved arm N and through the lever M they can be adjusted and held at pleasure. When moving to or from the field the frame may be so lowered in front as to raise the rake-teeth entirely above the ground.

The operation of the rake is as follows: The parts being in the position shown in Fig. 1—that is to say, with the rake-shaft locked and clutch thrown out—the driver causes the horse or horses to move on until enough distance is passed to form a windrow. He then places his foot on the front end of the lever H and presses it down. This throws the dog $c$ out of the depression in the cam-wheel I, and at the same time throws the half-clutches $l$ $m$ into gear, and the machine, still moving the drive-wheel D through the clutch, pulleys, and belt, immediately rotates the rake backward, leaving the hay in the windrow. The pressure of the driver's foot is but momentary, for as soon as the rake makes its rotation or half-rotation, as the case may be, he removes his foot, and the spring $e$, which was compressed by the lever, throws it up, ungearing the clutch and forcing the dog $c$ into or against the shoulder $d$ on the cam-wheel I, when it comes around, which locks the rake until another windrow is formed, and then another similar operation is gone through with, and so on.

There are some slight alterations which may be advantageously made in this rake—viz., the placing of the seat nearer to the drivingwheel; allowing the lever M to be alongside of instead of under the seat; the rounding off of the edge of the cam-wheel I; but these are mere mechanical changes.

I am aware that rakes have been held until released by the operator; but heretofore the rake-teeth or their equivalents must be in contact with the ground, so that contact rotated them, and even then the rotation was not positively certain. I lay no claim to any such contrivance; but What I do claim as new, and desire to secure by Letters Patent, is—

So connecting a lever, H, which actuates the dog $c$, with a clutch that gears with the driving-wheel D as that one operation throws out the dog and throws in the clutch, and vice versa, which makes a positive and compulsory rotation of the rake by the means herein set forth and described.

N. E. ALLEN.

Witnesses:
XURY WHITING,
T. B. CATLIN.